United States Patent
Rozman et al.

(10) Patent No.: US 9,548,691 B1
(45) Date of Patent: Jan. 17, 2017

(54) VARIABLE SPEED CONSTANT FREQUENCY POWER GENERATOR INCLUDING PERMANENT MAGNET EXCITER

(71) Applicant: Hamilton Sundstrand Corporation, Charlotte, NC (US)

(72) Inventors: Gregory I. Rozman, Rockford, IL (US); Jacek F. Gieras, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 23 days.

(21) Appl. No.: 14/748,920

(22) Filed: Jun. 24, 2015

(51) Int. Cl.
*H02P 9/00* (2006.01)

(52) U.S. Cl.
CPC .................... *H02P 9/007* (2013.01)

(58) Field of Classification Search
CPC ............. H02P 9/007; H02P 9/48; H02P 9/14; H02P 9/36
USPC ..................................... 322/61, 63
See application file for complete search history.

(56) References Cited

U.S. PATENT DOCUMENTS

| | | | | |
|---|---|---|---|---|
| 3,070,740 A * | 12/1962 | Stratton | ............... | H02K 19/38 322/100 |
| 3,378,756 A * | 4/1968 | Potter | .................. | H02P 9/42 318/821 |
| 3,571,693 A * | 3/1971 | Riaz | .................. | H02K 17/00 322/32 |
| 4,305,001 A * | 12/1981 | Vamaraju | ............... | H02P 9/42 290/5 |
| 4,622,629 A | 11/1986 | Glennon | | |
| 4,625,160 A * | 11/1986 | Hucker | ................. | H02K 3/16 310/115 |
| 4,982,123 A | 1/1991 | Raad | | |
| 6,420,842 B1 * | 7/2002 | Gold | .................... | H02H 7/06 307/113 |
| 7,915,869 B2 | 3/2011 | Xu et al. | | |
| 8,085,004 B2 | 12/2011 | Xu et al. | | |

(Continued)

OTHER PUBLICATIONS

Tian et al., "Communications Over Aircraft Power Lines: A Practical Implementation", http://www.ttcdas.com/products/daus_encoders/pdf/_tech_papers/tp_copl.pdf, accessed Jul. 8, 2015.

*Primary Examiner* — Tulsidas C Patel
*Assistant Examiner* — Sean Gugger
(74) *Attorney, Agent, or Firm* — Cantor Colburn LLP

(57) ABSTRACT

A variable speed constant frequency (VSCF) power generator includes a rotating direct current (DC) power source, rotating multi-phase generator main field windings to generate a rotating alternating current (AC) power, and a rotating inverter configured to control alternating current (AC) generator field windings in response to output AC power generated by the VSCF power generator and DC power from the rotating DC power source. At least one generator main field sensor outputs a generator main field feedback signal based on the rotating AC power applied to the rotating multi-phase generator main field windings. Stationary multi-phase generator armature windings output constant voltage constant frequency AC power controlled by the rotating AC power. An electronic rotating power line communication (PLC) controller generates a control signal that adjusts the rotating AC power based on the rotating generator feedback signal, where the output AC power is controlled by adjusting the rotating AC power.

15 Claims, 4 Drawing Sheets

(56) References Cited

U.S. PATENT DOCUMENTS

| | | | |
|---|---|---|---|
| 8,773,080 B2 * | 7/2014 | Albsmeier | H02P 9/04 322/24 |
| 8,836,293 B1 | 9/2014 | Rozman et al. | |
| 8,912,765 B2 | 12/2014 | Rozman et al. | |
| 8,928,293 B1 * | 1/2015 | Rozman | H02P 9/14 290/31 |
| 9,054,610 B2 * | 6/2015 | Rozman | H02P 9/02 |
| 9,325,229 B2 * | 4/2016 | Rozman | H02P 9/48 |
| 2006/0087293 A1 | 4/2006 | Xu et al. | |
| 2012/0007459 A1 * | 1/2012 | Mondal | H02K 17/44 310/185 |
| 2012/0153904 A1 * | 6/2012 | Albsmeier | H02P 9/04 322/28 |
| 2012/0286516 A1 * | 11/2012 | Chong | H02K 7/1823 290/52 |

* cited by examiner

VARIABLE SPEED CONSTANT FREQUENCY POWER GENERATOR INCLUDING PERMANENT MAGNET EXCITER

TECHNICAL FIELD

The present inventive concept is related to generator architectures, and in particular, to generator architectures utilizing main field rotating power converters.

BACKGROUND

In the simplest terms, power generators convert mechanical energy to electrical energy via the interaction of rotating magnetic fields and coils of wire. A multitude of alternating current (AC) generator systems, for example, have been developed with various means of providing interaction between magnetic fields and coils of wire. For example, an AC generator system may include an auxiliary power unit (APU) generator driven by a gas turbine engine to provide a secondary power source to an aircraft. The AC generator system is typically required to maintain a constant output frequency in order to properly drive electrical systems connected AC generator system output. However, the rotational speed of the drive shaft can vary during operation, thereby varying the respective output frequencies of the APU generator. Variable speed AC generator systems have been developed, which include large exciter assemblies due to the low frequency AC power required to be injected into the main generator field winding. Consequently, the large size of the exciter significantly increases the overall size and weight of conventional variable speed AC generator systems. Moreover, conventional variable speed AC generator systems drive the voltage/frequency controller with rotor mounted power converters via rotating signal transformers. Consequently, conventional variable speed AC generator systems require additional rotating signal transformers to electrically start the engine.

SUMMARY

According to a non-limiting embodiment, a variable speed constant frequency (VSCF) power generator includes a rotating direct current (DC) power source, rotating multi-phase generator main field windings to generate a rotating alternating current (AC) power, and a rotating inverter configured to control alternating current (AC) generator field windings in response to output AC power generated by the VSCF power generator and DC power from the rotating DC power source. At least one generator main field sensor outputs a generator main field feedback signal based on the rotating AC power applied to the rotating multi-phase generator main field windings. Stationary multi-phase generator armature windings output constant voltage constant frequency AC power controlled by the rotating AC power. An electronic rotating power line communication (PLC) controller generates a control signal that adjusts the rotating AC power based on the rotating generator feedback signal, where the output AC power is controlled by adjusting the rotating AC power According to another non-limiting embodiment, a method of controlling a variable speed constant frequency (VSCF) power generator comprises rotating a direct current (DC) power source, and rotating multi-phase generator main field windings to generate a rotating alternating current (AC) power. The method further includes rotating an inverter to control alternating current (AC) flowing through multi-phase generator field windings in response to output AC power generated by the VSCF power generator and DC power from the rotating DC power source. The method further includes outputting a generator main field feedback signal using at least one generator main field sensor based on the rotating AC power applied to the rotating multi-phase generator main field windings. The method further includes outputting constant voltage constant frequency AC power controlled by the rotating AC power using stationary multi-phase generator armature windings. The method further includes generating at least one control signal that adjusts the rotating AC power based on the rotating generator feedback signal such that the output AC power is controlled by adjusting the rotating AC power.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

According to a non-limiting embodiment, a variable speed constant frequency (VSCF) power generator is provided that excludes rotary signal transformers, while providing engine start function. The VSCF power generator includes a permanent magnet generator (PMG) that includes rotating three-phase windings section that rotates with respect a stationary permanent magnets (PM) to generate an initial un-controlled alternating current (AC) power. The rotating part of the VSCF power generator further includes a rotating rectifier that converts the initial AC power into a DC power, which is delivered to rotating inverter. The initial AC power is applied to an internal power supply (IPS) that powers an electronic rotating power line communication (PLC) controller and gate drives. The rotating PLC controller can communicate commands, variables and status over main generator stator and field windings.

The DC power is applied to the rotating inverter that produces variable voltage variable frequency power applied to the main generator field windings. When the generator is driven by the prime mover (gas turbine engine) below rated speed, the rotating inverter supplies AC power (frequency and current) to the main generator field windings to obtain desired frequency and voltage at the output of the VSCF power generator. The rotating AC power is transferred to generator armature windings assembly installed on a stationary section of the VSCF power generator. The output power at the generator armature windings assembly can be filtered before being delivered to an AC load. In this manner, the VSCF power generator can generate an AC power that powers the rotating PLC controller installed on the rotating part of the VSCF, and an AC power that is transferred to a stationary section of the VSCF power generator to drive an AC load, while excluding rotary signal transformers. Accordingly, a VSCF power generator according to at least one embodiment has a reduced size compared to conventional variable speed AC generator systems that implement conventional rotary signal transformers.

Figure 1A:
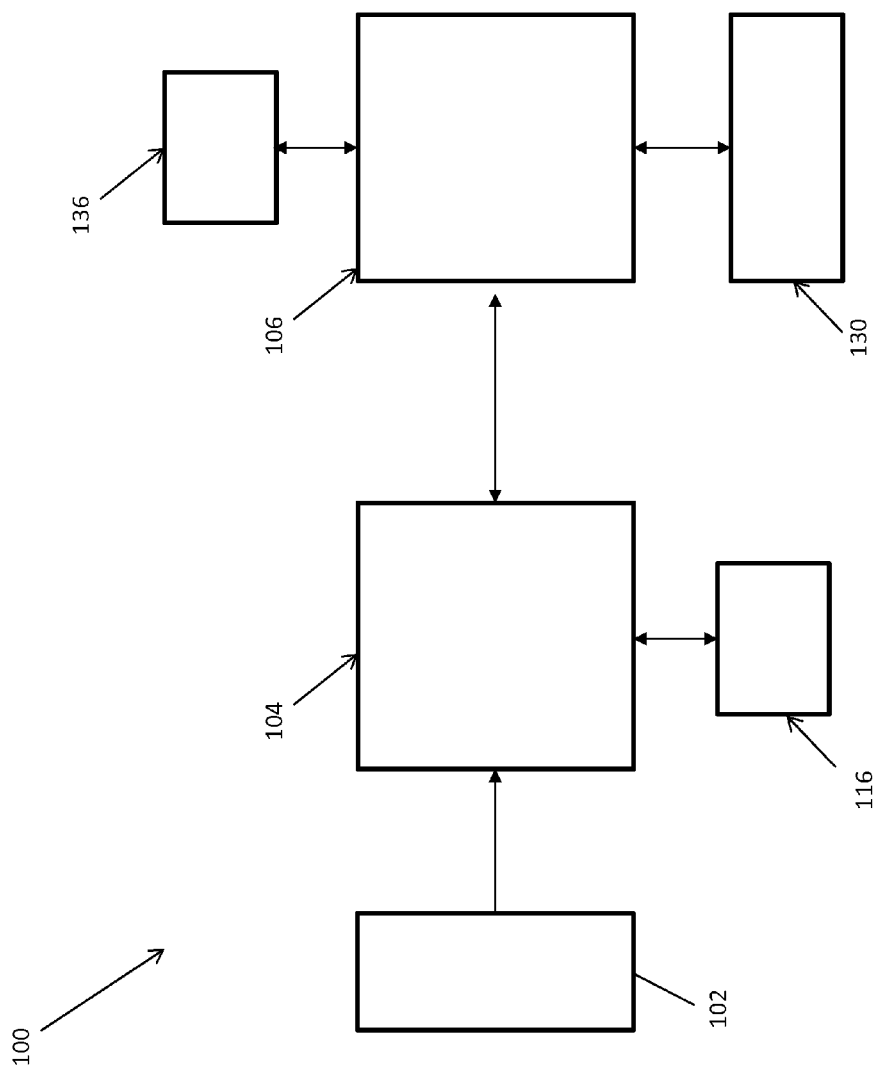
FIGS. 1A and 1B are an electrical schematics of a variable speed constant frequency (VSCF) power generator including permanent magnet exciter according to a non-limiting embodiment.
Figure 1B:
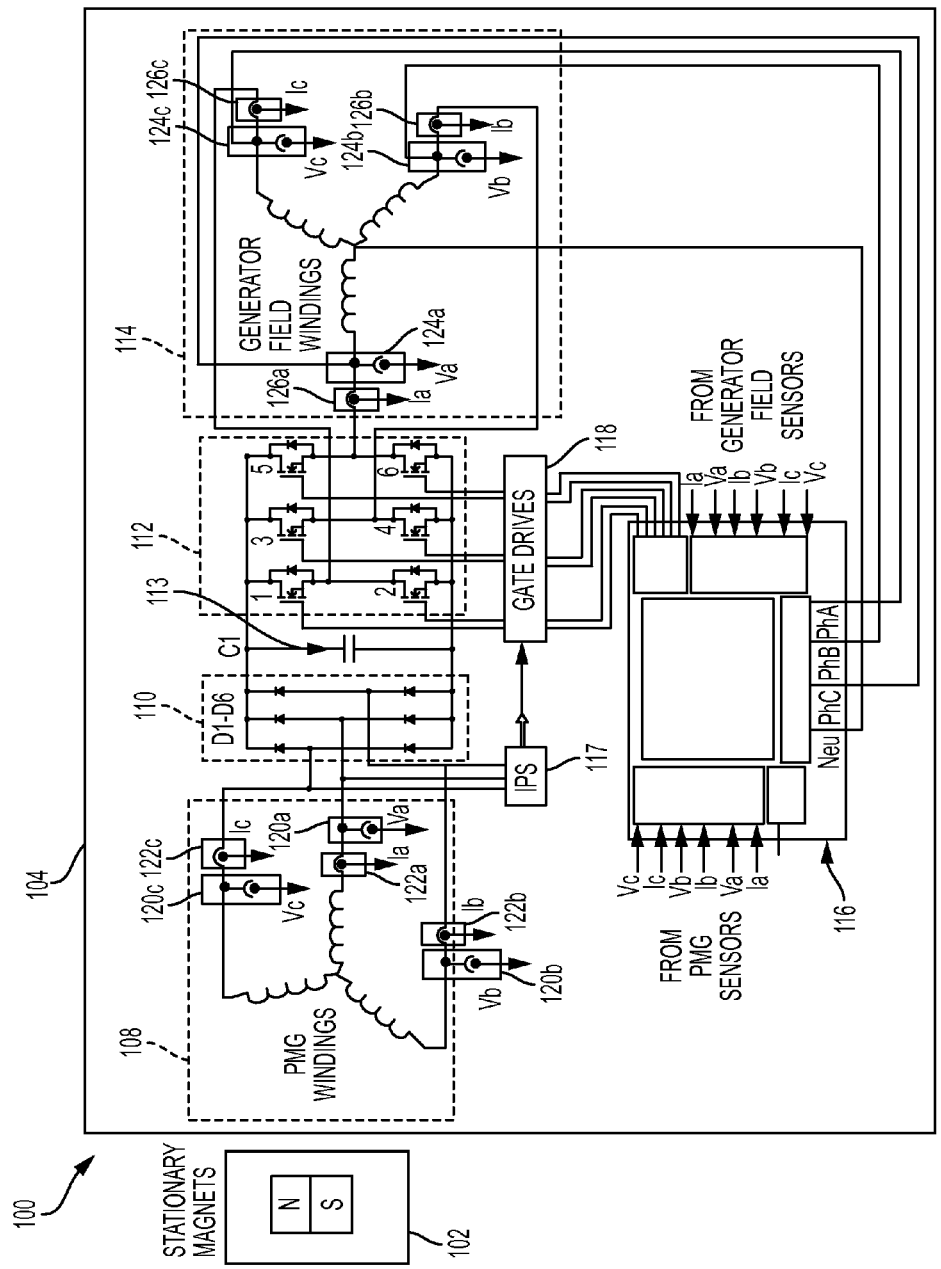
Figure 1B:
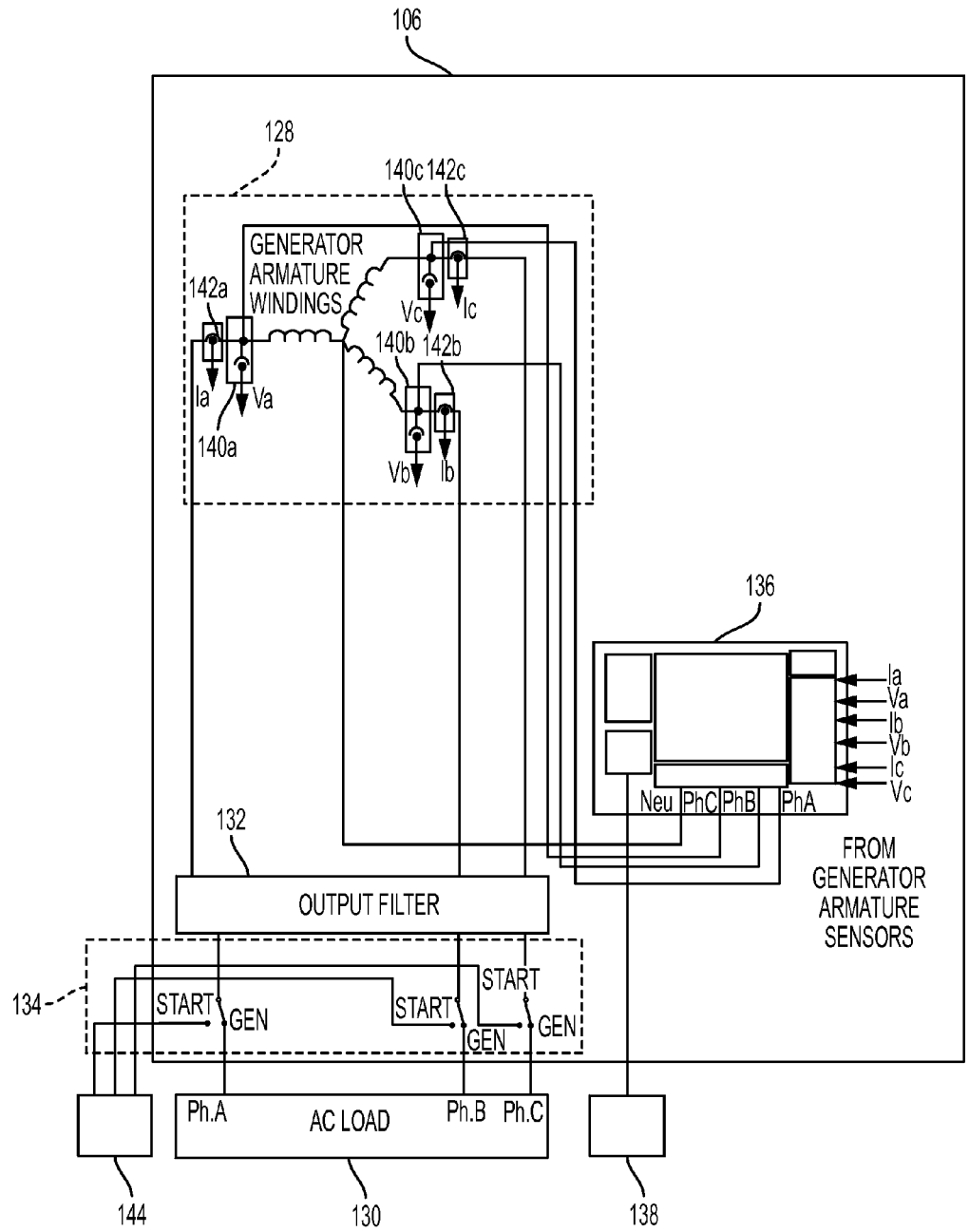

With reference now to FIGS. 1A and 1B, a VSCF power generating system 100 is illustrated according to a non-limiting embodiment. The VSCF power generating system 100 includes a permanent magnet generator (PMG) that comprises stationary permanent magnets (PM) 102, a three-phase windings located in the rotating section 104, and a stationary section 106. The PMG includes a stationary PM that generates a magnetic field. The rotating section 104 located proximate the PM 102 and is coupled to a rotatably driven shaft (not shown). Accordingly, the rotating section 104 rotates in proximity of the magnetic field. The rotating section 104 includes rotating PMG windings assembly 108, a rotating rectifier circuit 110, a rotating variable-voltage variable-frequency (VVVF) inverter circuit 112 that includes a DC bus capacitor 113, a rotating generator field winding 114, and a rotating electronic power line communication (PLC) controller 116.

According to a non-limiting embodiment, the rotating PMG winding assembly 108 is configured as a three-phase armature winding that is connected to the rotating rectifier circuit 110 which is configured as a 6-pulse rotating rectifier 110. The output of the rotating rectifier circuit 110 is connected to the VVVF inverter circuit 112 via the DC bus capacitor 113, all of which are disposed on the rotating section 104. According to a non-limiting embodiment, the DC bus capacitor 113 can be enhanced by adding a supercapacitor or replacing a conventional film or ceramic DC bus capacitor with a supercapacitor to obtain higher energy storage. If a supercapacitor is used instead of a conventional film or ceramic capacitor, then the PMG exciter (102/108) and the rotating rectifier 110 can be eliminated, since the supercapacitor would operate as a DC power source independent of the generator speed.

The AC power supplied by the rotating PMG windings assembly 108 is converted into a DC power by the rotating rectifier circuit 110, and supplied to the rotating inverter 112 that delivers AC power to the rotating generator main field winding 114. According to a non-limiting embodiment, the rotating main generator field winding 114 is configured as a three-phase armature winding which generates an electromagnetic field that is transferred across an air gap to the stationary section 106 as discussed in greater detail below. In addition, the output of the rotating PM winding assembly 108 can be tapped to deliver AC voltage to an IPS 117 which can power various components installed on the rotating section 104.

The rotating section 104 further includes a gate driver unit 118, which may be powered by the IPS 117. The gate drive unit may include, for example, one or more hi-side gate drivers (not shown) and one or more lo-side gate drivers (not shown). The gate drive unit 118 may selectively be controlled by the rotating PLC controller 116 to output the signals that control the VVVF inverter circuit 112. In the embodiment shown in FIG. 1B, the VVVF inverter circuit 112 includes a plurality of switches SW1-SW6, such as solid-state semiconductors configured as switching devices. The plurality of switches SW1-SW6 may include, for example, hi-side switches and low-side switches. By controlling the switches SW1-SW6 via a control signal sent by the rotating PLC controller 116, the AC voltage applied to the rotating generator main field winding 114 may be independently controlled.

The rotating PLC controller 116 is in electrical communication with the rotating PMG winding assembly 108, the rotating generator main field winding 114 and the gate driver unit 118. In this manner, the rotating PLC controller 116 is configured to synchronize AC power applied to the generator main field windings with the generator rotor position to obtain desired output frequency and voltage. According to an embodiment, the rotating section includes various rotating sensors that feedback electrical data to the rotating PLC controller 116. The rotating sensors include PMG windings voltage sensors 120a-120c, PMG windings current sensors 122a-122c, generator main field voltage sensors 124a-124c, and generator main field current sensors 126a-126c. Based on the monitored voltages and/or currents the rotating PLC controller 116 can detect generator rotor position. The PLC controller 116 can also leverage existing electrical communication lines included in the system 100 to perform various modulation techniques and provide additional system and network functions. The functions include, but are not limited to, serving as a modem over the rotating section power lines, serving as a modem analog interface, control start modes, dynamically monitor speed based on the signals of the PMG wires, dynamically control PMG voltage and current, dynamically control main generator field windings voltage and current, dynamically control main field frequency/phase control in response to generator shaft speed variations, dynamically control main field current control in response to desired voltage regulation, serve as a PWM interface to the gate drives, provide various electrical protective functions, and/or provide health monitoring and prognostics.

The stationary section 106 includes a stationary main generator armature winding 128 having one or more output windings connected to an AC load 130. The stationary armature windings 128 is configured, for example, as a three-phase armature windings 128 which is excited with the electromagnetic field generated by the rotating main generator field winding 114, and in turn generates AC output power (PhA, PhB, PhC) that is delivered to the AC load 130. According to an embodiment, the stationary section 106 further includes an output filter 132 that reduces electromagnetic interference (EMI) and harmonic distortions resulting from power processing performed by the VSCF power generator 100.

The stationary section 106 further includes a stationary PLC controller 136 in electrical communication with a vehicle host computer (VHC) 138, and the stationary armature windings. The VHC 138 monitors electric power generating system power quality and initiates operating modes such as engine start and/or power generation. The stationary armature winding 128. The stationary PLC controller 136 is configured to monitor output electrical characteristics of the stationary armature winding 128 and dynamically control the output power (PhA, PhB, PhC) delivered to the AC load 130. According to an embodiment, the stationary section 106 includes various stationary sensors that feedback electrical data to the stationary PLC controller 136. The stationary sensors include stationary armature voltage sensors 140a-140c, and stationary armature current sensors 142a-142c. Based on the monitored voltages and/or currents, the stationary PLC controller 136 can leverage existing electrical communication lines included in the system 100 to perform various modulation techniques and provide additional system and network functions. The functions include, but are not limited to, serving as a modem over the rotating section power lines, serving as a modem analog interface, dynamic output power (PhA, PhB, PhC) characterization, provide various electrical protective functions, and/or provide health monitoring and prognostics. The output power characterization includes, but is not limited to, RMS voltage, peak voltage, RMS current, peak current, total harmonic current distortion (current THD) frequency, frequency modulation.

According to an embodiment, the 100 may further include an external power source 144. The external power source 144 selectively injects power into the main generator armature windings via an output switching arrangement 134 and filter 132 to accomplish electric engine start. The external power source 144 may also utilize main generator rotor position and armature phase currents from PLC 136. During engine start mode, the external VVVF power source (inverter) supplies AC current to the main generator armature windings and is synchronized with the rotational position of the drive shaft which drives the rotating section 104. Accordingly, at least one embodiment described in detail above provides a VSCF power generating system 100 that is capable of enabling electric engine start without requiring additional rotating signal transformers found in conventional variable speed AC generator systems.

Figure 2:
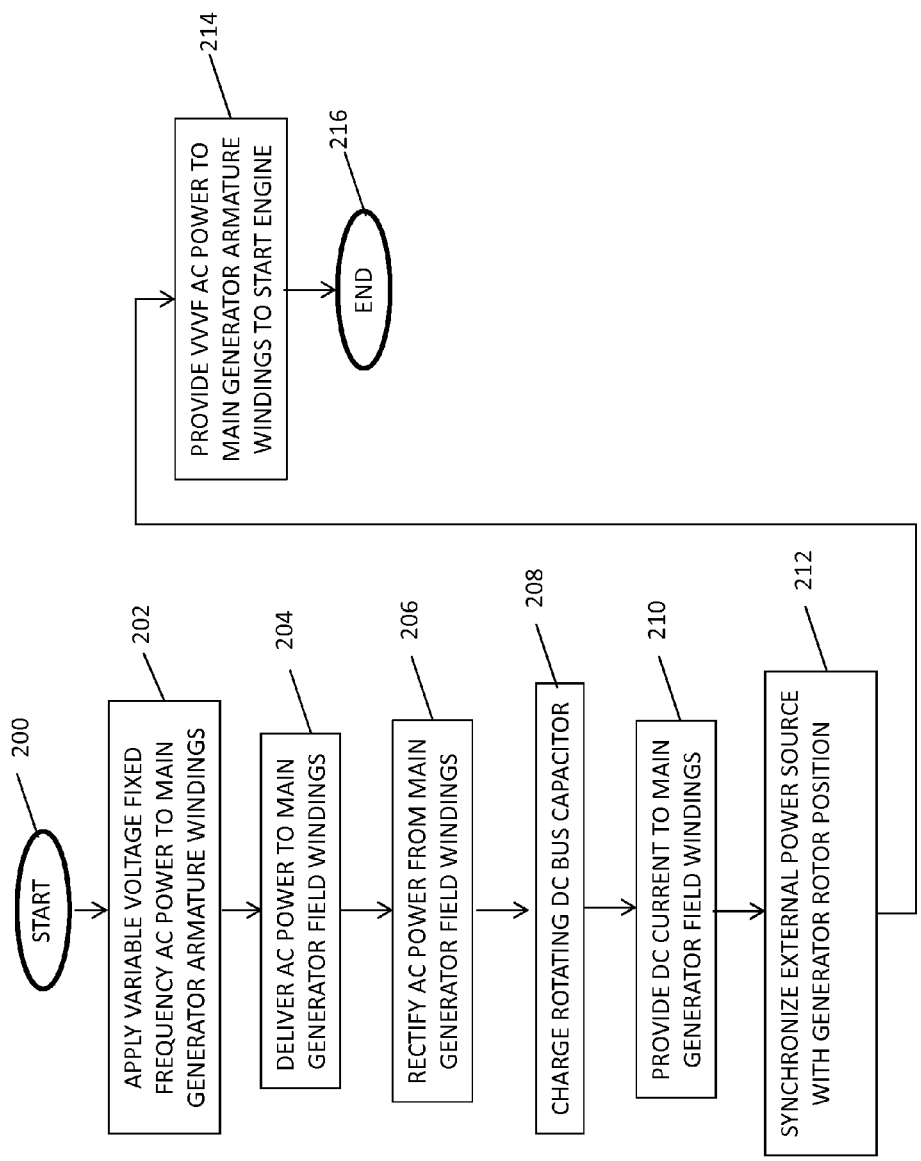
FIG. 2 is a flow diagram illustrating operations occurring during an engine start mode enabled by a VSCF power generating system according to a non-limiting embodiment.

Referring now to FIG. 2, a flow diagram illustrates operations occurring during an engine start mode enabled by the VSCF power generating system 100 according to a non-limiting embodiment. At operation 200 engine start mode is commenced, and a variable voltage fixed frequency AC power is applied to the main generator armature windings at operation 202. At operation 204, AC power is delivered to the main generator field windings. At operation 206, AC power from the main generator field windings is rectified by configuring inverter 112 as a 6-pulse rectifier (by disabling switches SW1-SW6) or by re-configuring inverter 112 which operates as an active rectifier by pulse width modulating (PWM) switches SW1-SW6. At operation 208, the rotating DC bus capacitor 113 is charged. The DC bus capacitor charging current is controlled by variable voltage fixed frequency AC power which is applied to the main generator armature windings. At operation 210, after charging the DC bus capacitor 113 is complete, the inverter 112 is reconfigured to provide DC current to the main generator field windings associated with the current sensors 126c and 126b. The DC current is provided, for example, via an uncontrolled mode by closing SW1 and SW4, and open SW2,SW3,SW5,SW6 (other similar two phase arrangements can be used), or via a controlled mode by PWM SW and SW4 and keeping other switches open. At operation 212, the variable voltage variable frequency (VVVF) external AC power source is controlled in synchronization with the generator rotor position to start the engine. According to a non-limiting embodiment, a well-known field oriented control (FOC) can be used to synchronize the VVVF external power source with the generator rotor portion. At operation 214, more power is supplied to the inverter 112 by the PMG exciter 102/108 and rotating rectifier 110 as the engine accelerates, and the engine start mode ends at operation 216. Accordingly, at least one non-limiting embodiment provides a VSCF power generating system 100 that is capable of enabling electric engine start while eliminating additional rotating signal transformers typically required by conventional variable speed AC generator systems.

As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A variable speed constant frequency (VSCF) power generator, comprising:
    a rotating direct current (DC) power source;
    a rotating multi-phase generator main field winding assembly to generate a rotating alternating current (AC) power;
    a rotating inverter configured to control an alternating current (AC) multi-phase generator field winding assembly in response to output AC power generated by the VSCF power generator and DC power from the rotating DC power source;
    at least one generator main field sensor configured to output a generator main field feedback signal based on the rotating AC power applied to the rotating multi-phase generator main field winding assembly;
    a stationary multi-phase generator armature winding assembly configured to output constant voltage constant frequency AC power controlled by the rotating AC power; and
    an electronic rotating power line communication (PLC) controller in signal communication with the at least one rotating generator sensor, and configured to generate at least one control signal that adjusts the rotating AC power based on the rotating generator feedback signal, wherein the output AC power is controlled by adjusting the rotating AC power.

2. The VSCF power generator of claim 1, wherein the rotating DC power source further comprises:
    a permanent magnet generator (PMG) rotating winding assembly;
    at least one PMG winding sensor configured to output a PMG feedback signal based on generator speed;
    a rotating rectifier; and
    a DC bus capacitor.

3. The VSCF power generator of claim 2, wherein the PMG further comprises stationary permanent magnets.

4. The VSCF power generator of claim 1, wherein the rotating DC power source further comprises a supercapacitor.

5. The VSCF power generator of claim 1, further comprising a stationary section, the stationary section further comprising:
    at least one stationary armature sensor configured to output a stationary armature feedback signal based on the output AC power at the stationary armature winding; and
    an electronic stationary power line communication (PLC) controller in signal communication with the at least one stationary armature sensor, and configured to generate at least one output control signal that adjusts the output AC power based on the stationary armature feedback signal.

6. The VSCF power generator of claim 1, further comprising a rotating section, the rotating section further comprising:
a rotating PMG winding assembly configured rotate with respect to the stationary permanent magnets to generate an initial AC power;
a rotating rectifier circuit configured to convert the initial AC power into a DC power;
and a rotating inverter circuit that controls an amount of the AC power delivered to the rotating generator main field winding assembly.

7. The VSCF power generator of claim 6, wherein the rotating section further comprises a gate driver unit configured to control the rotating inverter circuit.

8. The VSCF power generator of claim 7, wherein the rotating inverter circuit selectively delivers the amount of the DC power to the generator main field winding assembly based on at least one gate signal output by the gate driver unit.

9. The VSCF power generator of claim 8, wherein the rotating section further comprises:
at least one PMG winding sensor configured to output a PMG winding feedback signal based on the initial AC power at the rotating PMG winding assembly,
wherein the rotating PLC controller generates the at least one output control signal based on at least one of the stationary armature feedback signal and the PMG winding feedback signal.

10. The VSCF power generator of claim 9, wherein the rotating PLC controller outputs at least one pulse width modulated (PWM) drive signal based on at least one of the stationary armature feedback signal and the PMG winding feedback signal, and wherein the gate drive unit controls the rotating inverter circuit to selectively deliver the amount of the AC power to the generator main field winding based on the at least one PWM drive signal.

11. The VSCF power generator of claim 6, wherein the rotating section comprises a DC bus capacitor.

12. The VSCF power generator of claim 5, further comprising an output filter that filters noise from the output power.

13. The VSCF power generator of claim 12, further comprising:
an external power source configured to generate an external AC power; and
an output switching assembly interposed between the output filter and an AC load that receives the output power, the output switching assembly configured to selectively deliver the external AC power to the AC load.

14. The VSCF power generator of claim 13, wherein the AC load is an engine, and wherein the rotating inverter circuit supplies DC current to the at least one generator main field winding, while the external power source provides the external AC power to the at least one stationary armature winding in response to starting the engine and/or charging the DC power source.

15. A method of controlling a variable speed constant frequency (VSCF) power generator, the method comprising:
rotating a direct current (DC) power source;
rotating multi-phase generator main field windings to generate a rotating alternating current (AC) power;
rotating an inverter to control alternating current (AC) flowing through multi-phase generator field windings in response to output AC power generated by the VSCF power generator and DC power from the rotating DC power source;
outputting a generator main field feedback signal using at least one generator main field sensor based on the rotating AC power applied to the rotating multi-phase generator main field windings;
outputting constant voltage constant frequency AC power controlled by the rotating AC power using stationary multi-phase generator armature windings; and
generating at least one control signal that adjusts the rotating AC power based on the rotating generator feedback signal such that the output AC power is controlled by adjusting the rotating AC power.

* * * * *